US011475912B1

(12) United States Patent
Bellorado et al.

(10) Patent No.: US 11,475,912 B1
(45) Date of Patent: Oct. 18, 2022

(54) SYNCHRONOUS WRITING OF PATTERNED MEDIA

(71) Applicant: Seagate Technology LLC, Fremont, CA (US)

(72) Inventors: Jason Bellorado, San Jose, CA (US); Marcus Marrow, San Jose, CA (US); Zheng Wu, Los Altos, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/345,759

(22) Filed: Jun. 11, 2021

(51) Int. Cl.
*G11B 20/14* (2006.01)
*G11B 5/596* (2006.01)
*G11B 5/012* (2006.01)

(52) U.S. Cl.
CPC .......... *G11B 5/59616* (2013.01); *G11B 5/012* (2013.01)

(58) Field of Classification Search
None
See application file for complete search history.

(56) References Cited

U.S. PATENT DOCUMENTS

| | | |
|---|---|---|
| 6,757,116 B1 | 6/2004 | Curtiss et al. |
| 6,805,966 B1 | 10/2004 | Formato et al. |
| 6,977,108 B2 | 12/2005 | Hieda et al. |
| 7,133,245 B2 | 11/2006 | Nakao et al. |
| 7,153,597 B2 | 12/2006 | Yang et al. |
| 7,218,465 B1 | 5/2007 | Deeman et al. |
| 7,309,630 B2 | 12/2007 | Fan et al. |
| 7,609,469 B2 | 10/2009 | Gage et al. |
| 7,643,234 B2 | 1/2010 | Albrecht et al. |
| 7,643,235 B2 | 1/2010 | Erden et al. |
| 7,704,614 B2 | 4/2010 | Lee et al. |
| 7,706,092 B2 | 4/2010 | Ling et al. |
| 7,729,074 B2 | 6/2010 | Venkataramani et al. |
| 7,835,099 B2 | 11/2010 | Mallary et al. |
| 7,898,762 B1* | 3/2011 | Guo .................. G11B 5/59688 360/77.08 |
| 7,911,728 B2 | 3/2011 | Albrecht et al. |
| 7,920,354 B2 | 4/2011 | Pokharel et al. |
| 7,948,701 B2 | 5/2011 | Albrecht et al. |
| 7,965,464 B2 | 6/2011 | Batra et al. |
| 3,035,910 A1 | 10/2011 | Mallary et al. |
| 8,094,398 B2 | 1/2012 | Suzuki |

(Continued)

FOREIGN PATENT DOCUMENTS

JP 2007207385 A 8/2007

*Primary Examiner* — Peter Vincent Agustin
(74) *Attorney, Agent, or Firm* — Christian W. Best

(57) ABSTRACT

Systems and methods are disclosed for synchronous writing of a grain patterned medium. The systems and methods can be implemented within a data storage device having a grain patterned medium. Further, a calibration process to determine a count of bits between servo wedges can be implemented in manufacturing, within the data storage device, or both. In some examples, the data storage device, during operation, can utilize the count of bits to perform synchronous writing, determine write errors, or both. Further, the servo wedge of the grain patterned medium may be patterned with a same or similar grain pattern as the data area that follows the servo wedge. Such a data storage device can implement a single clock for reading a servo wedge and writing a data area.

27 Claims, 13 Drawing Sheets

(56) References Cited

U.S. PATENT DOCUMENTS

| | | | |
|---|---|---|---|
| 8,139,301 B1* | 3/2012 | Li | G11B 5/012 360/39 |
| 8,154,813 B2 | 4/2012 | Weller et al. | |
| 8,257,560 B2 | 9/2012 | Kamata et al. | |
| 8,300,341 B2 | 10/2012 | Itakura et al. | |
| 8,335,047 B2 | 12/2012 | Hirano et al. | |
| 8,432,633 B2 | 4/2013 | Grob et al. | |
| 8,441,758 B2 | 5/2013 | Albrecht et al. | |
| 8,481,181 B2 | 7/2013 | Wang et al. | |
| 8,508,878 B1 | 8/2013 | Zou et al. | |
| 8,508,879 B1 | 8/2013 | Zou et al. | |
| 8,687,304 B1* | 4/2014 | Zou | G11B 5/012 360/51 |
| 8,737,001 B2 | 5/2014 | Chauhan et al. | |
| 8,755,139 B1 | 6/2014 | Zou et al. | |
| 8,824,079 B2 | 9/2014 | Pokharel et al. | |
| 8,824,249 B2 | 9/2014 | Erden et al. | |
| 8,873,178 B2 | 10/2014 | Erden et al. | |
| 8,879,185 B1 | 11/2014 | Zou et al. | |
| 8,947,809 B2 | 2/2015 | Ozturk et al. | |
| 9,019,646 B2 | 4/2015 | Tim et al. | |
| 9,087,541 B1 | 7/2015 | Pokharel et al. | |
| 9,099,160 B2 | 8/2015 | Mallary et al. | |
| 9,524,743 B2 | 12/2016 | Zhu et al. | |
| 9,626,996 B2 | 4/2017 | Yang et al. | |
| 9,666,212 B2 | 5/2017 | Han et al. | |
| 9,792,935 B2 | 10/2017 | Rejda et al. | |
| 9,805,744 B1 | 10/2017 | Xue et al. | |
| 9,858,961 B2 | 1/2018 | Zhu et al. | |
| 10,049,698 B2 | 8/2018 | Zhu et al. | |
| 10,297,281 B1 | 5/2019 | Bellorado et al. | |
| 10,522,177 B1 | 12/2019 | Bellorado et al. | |
| 10,523,330 B2 | 12/2019 | Fujita et al. | |
| 10,964,347 B2 | 3/2021 | Cheng et al. | |
| 2007/0042229 A1* | 2/2007 | Albrecht | G11B 5/855 427/127 |
| 2008/0304173 A1* | 12/2008 | Albrecht | G11B 5/746 360/51 |
| 2009/0147402 A1 | 6/2009 | Sul et al. | |
| 2010/0202079 A1* | 8/2010 | Buch | G11B 20/14 |

\* cited by examiner

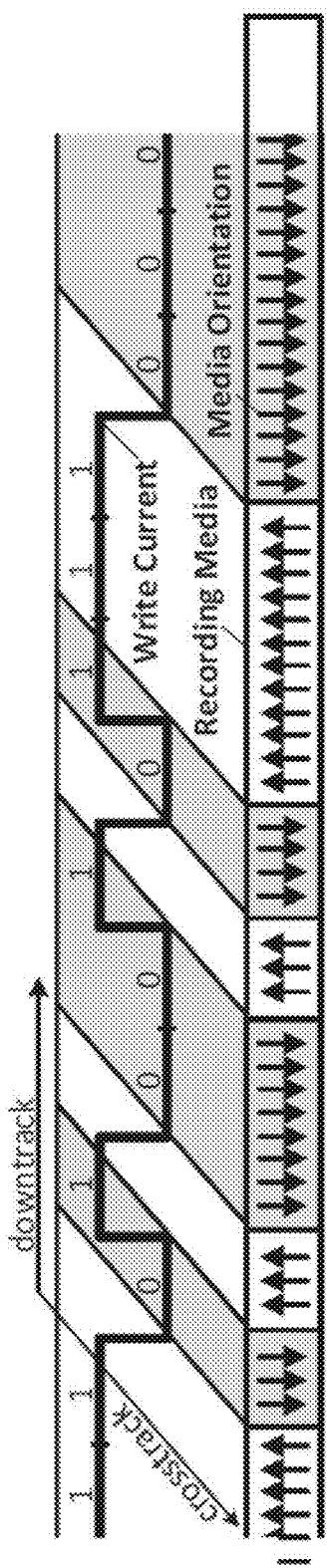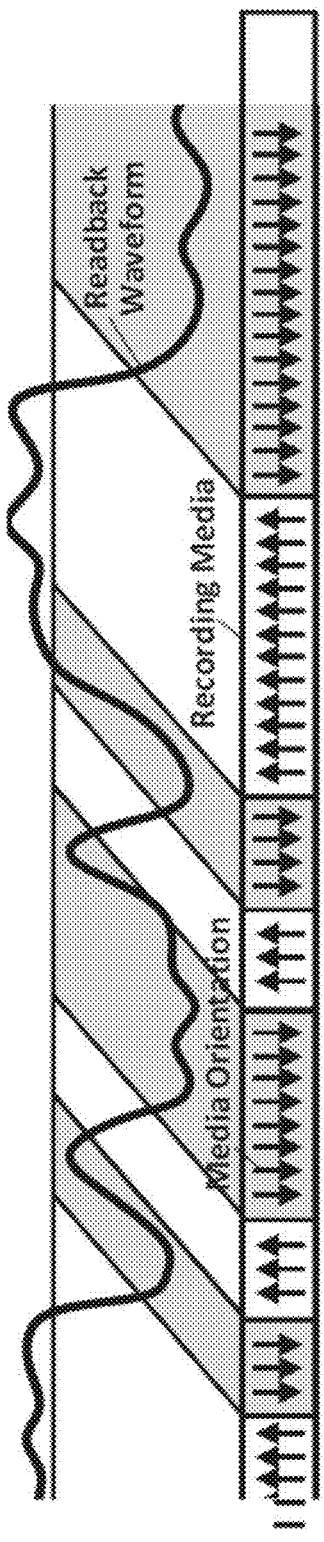
FIG. 3A
FIG. 3B

SYNCHRONOUS WRITING OF PATTERNED MEDIA

SUMMARY

In certain embodiments, an apparatus may comprise a continuous time front end (CTFE) circuit. The CTFE circuit may be configured to receive an analog read signal corresponding to a grain patterned medium having servo wedges and data areas with a same grain pattern density and process the analog signal to generate a modified analog signal. The apparatus may also include an analog to digital converter (A/D) circuit configured to receive the modified analog signal and generate digital samples from the modified analog signal. The apparatus may also include a phase locked loop (PLL) circuit configured to generate a first clock signal and a first digital phase converter (DPC) circuit configured to generate a second clock signal by phase shifting the first clock signal based on an applied control signal and provide the second clock signal to the A/D circuit to control the generating of the digital samples. The apparatus may also include a write channel configured to synchronously write data to the data areas of the grain patterned medium based on the second clock signal and a servo channel configured to read servo information from a servo wedge based on the second clock signal.

In certain embodiments, a method may comprise writing, on a grain patterned medium, a data area with a known data pattern, performing a read of the data area to obtain a detected bit sequence, determining a deviation between the detected bit sequence and the known data pattern, determining a count of media patterns within the data area based on the deviation, and storing the count of media patterns to enable synchronous writing of the grain patterned media.

In certain embodiments, an apparatus may comprise an integrated circuit including a detector circuit configured to detect a bit sequence read from a patterned medium and a data generator circuit coupled to a delay line and configured to generate bits of a known data pattern. The integrated circuit may also include: multiple bit-error counters coupled to the delay line and each configured to compare a bit or shifted bit of the known data pattern to a bit of the detected bit sequence and count a number of bit-errors over a period of time; a control circuit configured to count a number of bits processed by the bit-error counters; multiple registers, each of the multiple registers configured to store a result of a corresponding bit-error counter over the period of time; and an adjustment circuit configured to modify a count of grain patterns between two servo wedges of the patterned medium based on the results of the bit-error counters stored in the registers, the adjustment circuit further configured to store the modified count of grain patterns to enable synchronous writing of the grain patterned medium.

In certain embodiments, an apparatus comprising a control circuit configured to: manage read operations and write operations to a grain patterned data storage medium having a track with a homogenous media feature pattern for the entirety of the track, the track including a servo region and a data region; and adjust a clock frequency and phase based on a read in the servo region to maintain a desired alignment for a write in the data region. The apparatus may also include a single, common clock utilized for all write operations and read operations to both the servo region and the data region.

BRIEF DESCRIPTION OF THE DRAWINGS

FIG. 3A is a diagram of a system for writing continuous media, in accordance with certain embodiments of the present disclosure;

FIG. 3B is a diagram of a system for writing continuous media, in accordance with certain embodiments of the present disclosure;

DETAILED DESCRIPTION

Figure 1:
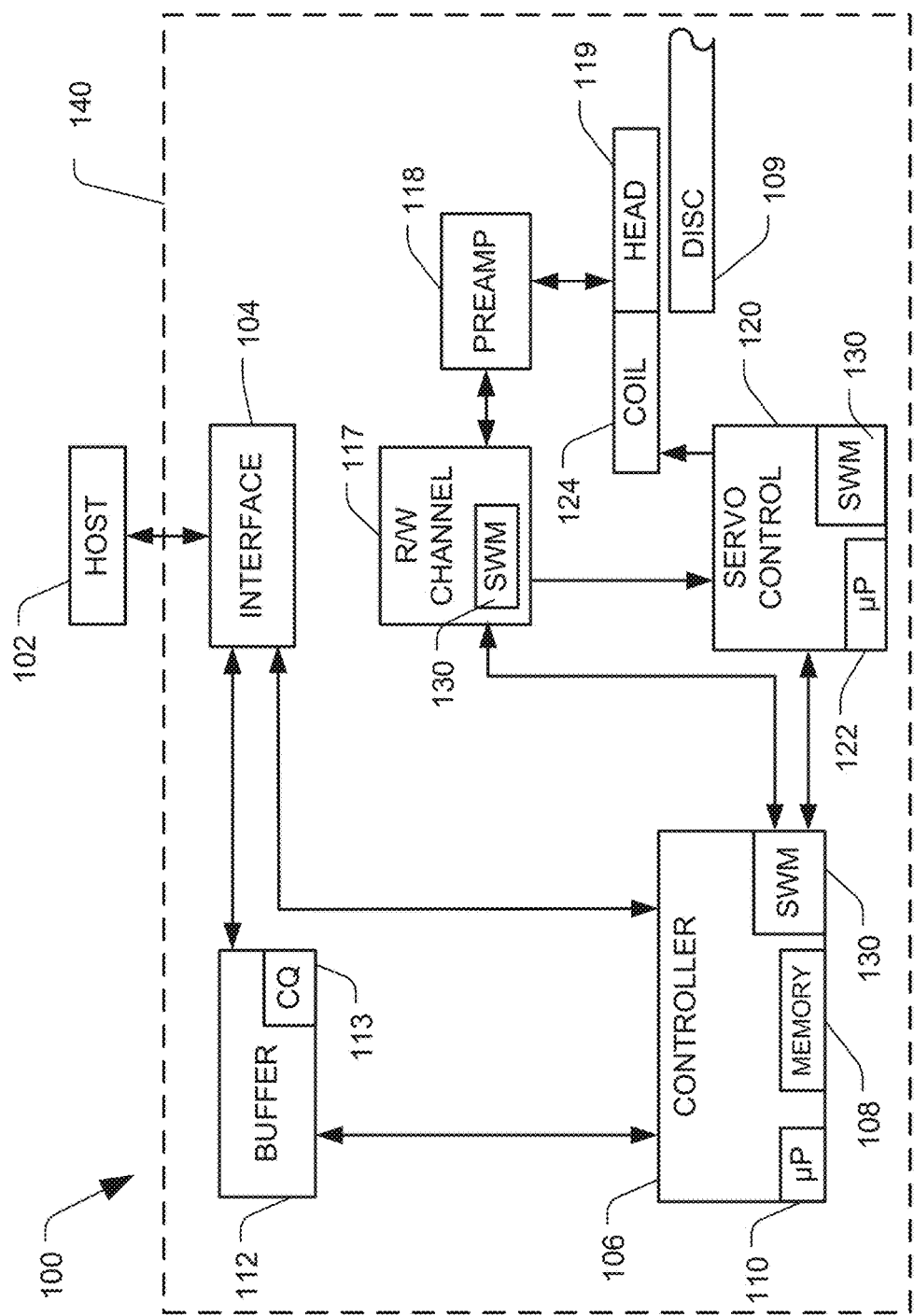
FIG. 1 is a diagram of a system for synchronous writing of patterned media, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, system-on-chip (SoC), and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor to perform a particular task or job, or may be any combination thereof. Further, the methods described herein may be implemented as a computer readable storage medium or memory device including instructions that, when executed, cause a processor to perform the methods.

While the discussion herein is provided with respect to magnetic data storage, one skilled in the art will recognize that the technologies and solutions disclosed are applicable to any system that can implement synchronous writes to a patterned media. As used herein, the terms "synchronous write" and "synchronous writing" mean a write process where a clock transitions a write current at an approximate known location with respect to the media. In some examples, a write current can transition between media features of a grain patterned media, such as over non-magnetic material separating grain patterns or between adjacent grains of the patterned media. A bit may be stored within one or more grains of the patterned media; grains or groups of grains may be separated by a non-magnetic material region.

Generally, a magnetic medium with patterned media has segregated magnetic grains or groups of magnetic grains with regions of non-magnetic material between the magnetic grains or between the groups of grains; where the regions of non-magnetic material may reduce the noise encountered during the operation of data recovery. While grain patterned media allows a higher areal density, it also presents significant challenges both in its fabrication and in the systems required to store and reliably retrieve data from the patterned media. For example, patterned media (a.k.a., grain patterned media) requires higher precision writing than media because a misalignment of the write signal to the media patterns could lead to numerous indeterminate bits when the write current transitions at an unknown location over a media feature instead of over a known location. In some examples, when the write current transitions at a wrong location over the grain patterns, a corresponding bit could take on either polarity with equal probability; thus, such can lead to a higher number of bit-errors than the data channel (e.g., a detector, error correcting code, or both) can correct. The systems and processes discussed herein provide solutions to these and other system-level difficulties encountered in working with patterned media.

FIG. 1 is a diagram of a system 100 for synchronous writing of patterned media, in accordance with certain embodiments of the present disclosure. Specifically, FIG. 1 provides a functional block diagram of an example data storage device (DSD) 100. The DSD 100 can communicate with a host device 102 (such as a server or personal computing device) via a hardware or firmware-based interface circuit 104. The interface 104 may comprise any interface that allows communication between a host 102 and a DSD 100, either wired or wireless. The interface 104 may include a connector (not shown) that allows the DSD 100 to be physically removed from the host 102. In some embodiments, the DSD 100 may have a casing 140 housing the components of the DSD 100, or the components of the DSD 100 may be attached to the housing, or a combination thereof.

The buffer memory 112 can temporarily store data during read and write operations, and can include a command queue (CQ) 113 where multiple pending operations can be temporarily stored pending execution. Commands arriving over the interface 104 may be received in the CQ 113 or may be stored there by controller 106, interface 104, or another component.

The DSD 100 can include a programmable controller 106, which can include associated memory 108 and processor 110. The DSD 100 can include a read-write (R/W) data channel 117, which can encode data during write operations and reconstruct user data retrieved from a memory, such as disc(s) 109, during read operations. A preamplifier circuit (preamp) 118 can apply write currents to the head(s) 119 and provide pre-amplification of read-back signals. A servo control circuit 120 may use servo data to provide the appropriate current to the coil 124, sometimes called a voice coil motor (VCM), to position the head(s) 119 over a desired area of the disc(s) 109. The controller 106 can communicate with a processor 122 to move the head(s) 119 to the desired locations on the disc(s) 109 during execution of various pending commands, such as read or write commands in the command queue 113.

DSD 100 may also include a synchronous writing module (SWM) 130. The SWM 130 may operate to perform the synchronizing and calibration processes described herein. The SWM 130 may be a logic circuit, processor, controller, discrete electronics, other circuit, a set of software instructions that when executed by a processing device perform the functions of the SWM 130, or any combination thereof. In some embodiments, the SWM 130 may be part of or executed by controller 106, part of or executed by servo control circuit 120, part of or executed by data channel circuit(s) 117, included in or performed by other components of the DSD 100, or any combination thereof. In some embodiments, the SWM 130 may include the circuits described in FIGS. 8 and 12 and may implement the method described in FIG. 11.

The head(s) 119 of DSD 100 may be used to write data to and read data from disc(s) 109. The head(s) 119 may include both a write head element and a read head element. The write head produces a magnetic field to write a signal to the disc 109 to facilitate storing data thereon. As the disc(s) 109 spin, the write head can store data in narrow concentric data tracks on the disc. The read head can read data from the disc(s) by generating a signal based on detected magnetic transitions stored to the disc(s) 109.

Figure 2A:
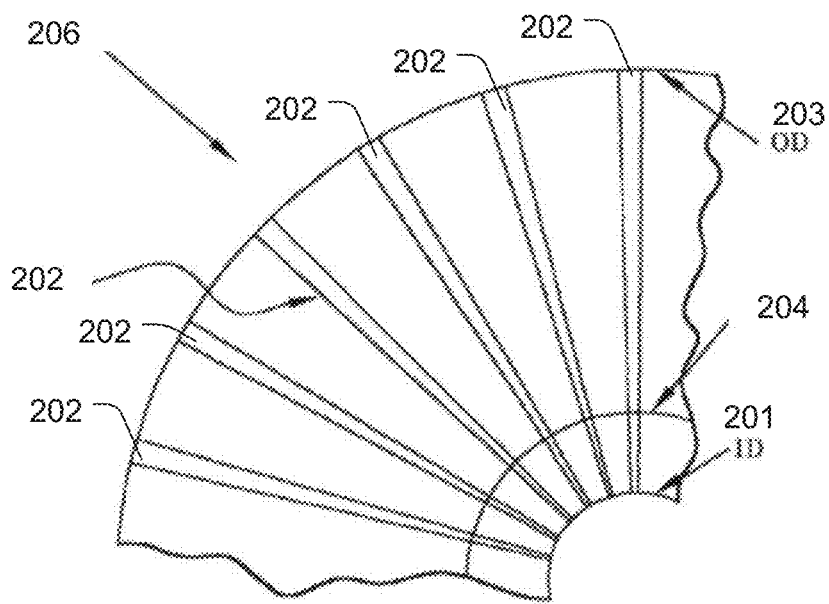
FIG. 2A is a diagram of a layout of servo and user data regions on a disc of a hard drive that can be utilized for synchronous writing of patterned media, in accordance with certain embodiments of the present disclosure.
Figure 2B:
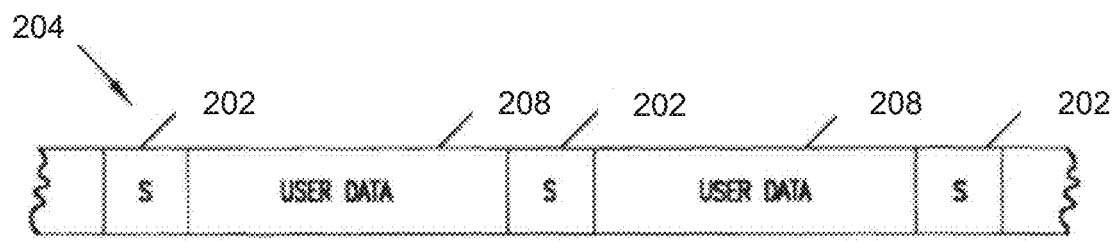
FIG. 2B is a diagram of a layout of servo and user data regions on a disc of a hard drive that can be utilized for synchronous writing of patterned media, in accordance with certain embodiments of the present disclosure.

FIGS. 2A and 2B show a layout of servo and user data regions on a disc of a hard drive, which can be utilized with patterned media, in accordance with certain embodiments of the present disclosure. Specifically, disc 206 is an example embodiment of disc(s) 109. As shown, disc 206 can include multiple servo wedges 202 that extend along a radial direction of the disc 206 between an inner diameter (ID) 201 and an outer diameter (OD) 203. The disc 206 can also have multiple concentric tracks, track 204 being an example thereof. The inner diameter 201 can be adjacent to a spindle about which the disc 206 can rotate during operation of the DSD 100.

FIG. 2B shows an exploded view of track 204, which can include servo wedges 202 evenly spaced around each track and data portions 208 interspersed between the servo wedges 202. User data may be stored in data portions 208, which may be any type of non-servo data.

The disc(s) 109 and disc 206 can have a grain patterned media, which comprises distinct regions of magnetic and non-magnetic material on the disc 206 where the magnetic regions can only be written in relation to the position of a write head to the magnetic regions; such is different than continuous media, which comprises a surface of continuous magnetic grains and the locations along a track in which the media changes polarity are governed only by the locations of the write current transitions relative to the media. Both types of media are able to be polarized in one of two orientations through use of an applied magnetic field via the write head(s) 119. The nature of continuous media allows a bit to be recorded any way on its surface and is only governed by the location of the write head(s) 119 when the respective bit is written. However, patterned media must be precisely written such that the magnetic regions have the associated write current applied over a magnetic region and write current transitions applied over a non-magnetic region or at another known location. Utilizing grain patterned media can reduce the noise encountered during the operation of data recovery due to the segregating of magnetic regions with non-magnetic material. The processes described herein provide improvements to writing a grain patterned media that can allow for reduced read data errors during operation of the associated data storage device.

FIGS. 3A and 3B are diagrams of systems for writing continuous media. Specifically, FIG. 3A depicts a write operation over a track, such as track 204, in which the modulating data sequence is shown along with the write current at the instant the write element is adjacent to the depicted media. The result of this write operation is that the magnetization of the media is also modulated by the written data sequence. The media adjacent to negative write currents, as modulated by 0's, is polarized in the downward direction whereas the media adjacent to positive write currents, as modulated by 1's, is polarized in the upward direction.

FIG. 3B depicts a recovery (e.g., read) operation that is similar to the write operation in that a read head containing a read element, such as head(s) 119, is radially positioned such that it will pass over the location of the data to be recovered. Due to a quantum mechanical property of the read element known as MagnetoResistance (MR), its electrical resistance is modulated by the magnetic field being applied to it by the nearby media. As such, a current passing through the read element is also modulated by the magnetization of the media generating a readback waveform that can be applied to the DSD's circuitry (e.g., read channel 117 or controller 106) for sampling and reconstruction of the data sequence stored on the media.

Figure 4:
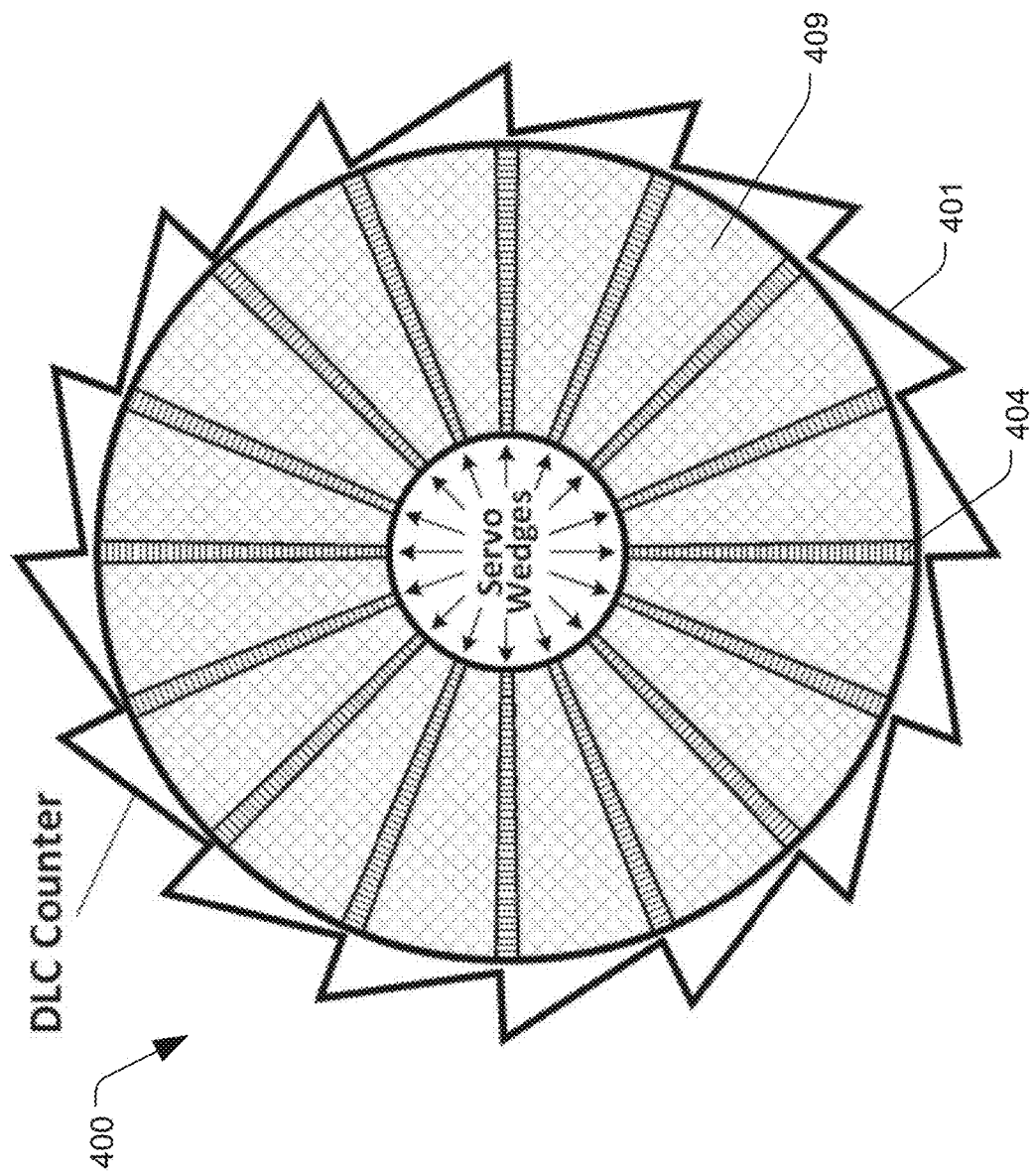
FIG. 4 is a diagram of a disc layout with servo regions and data regions that implement patterned media for synchronous writing thereof, in accordance with certain embodiments of the present disclosure.

FIG. 4 shows a diagram of a disc layout with servo regions and data regions that implement patterned media in a system for synchronous writing of patterned media, in accordance with certain embodiments of the present disclosure. A disc 400 can have multiple servo wedges 404 separating multiple user data regions 409. Disc 400 can be the disc(s) 109 or the disc 206.

Clocks used to write and read data to the disc 400 need to be made constant with respect to the disc's rotational velocity to allow for successful recovery of data stored thereon. Ensuring the consistency of write and read clocks with respect to the motion of the media can be performed by a subsystem known as a disk locked clock (DLC). The DLC can be a sub-circuit of the channel 117 or the SWM 130.

The DLC can ensure the consistency of the write and read clocks with respect to the motion of the media. Although a DLC can be implemented in a number of forms, an aspect common to all variants is that a reference is made between the clock and fixed locations on the media. The frequency (and, potentially, phase) of the clock is, then, modulated to fix the clock with respect to these locations, thus compensating for any deviation in the rotational velocity from its expected value.

As the example of FIG. 4 shows, servo wedges 404 can be utilized as a clock reference in combination with a DLC counter 401. For example, servo wedges 404 can be written continuously from the inner-diameter to the outer-diameter of the disc 400 (or written such that they are available everywhere data is written or read) and can be evenly spaced around the circumference of the disc 400. Further, servo wedges 404 can be written once during manufacturing and never re-written and, thus, they are able to provide the requisite fixed features on the disc 400 to which the clock may be referenced. For example, as the read head passes over each servo wedge, the written servo pattern can be sampled and used to ascertain the clock's alignment to the written data pattern. In the depicted example, a clock cycle counter (e.g., DLC counter 401) can be implemented to determine the number of clock cycles between the selected feature in adjacent servo wedges. By adjusting the phase or frequency (or both) of the clock used for read and write operations to make the number of clock cycles separating adjacent servo wedges constant, any variation in the media velocity can be compensated for.

During operation of the DLC counter 401, because the servo wedges may not be exactly evenly spaced around the disc and because the rotational velocity of the disc may not be uniform around a revolution, it could be observed that the number of clock cycles would greater than or less than an expected target value for each selected feature (e.g., between specific servo wedges). The DLC operation can modulate the clock frequencies to ensure that an expected number of clock cycles are observed between servo wedges, thus maintaining clocks that are consistent with the media rotation.

Figure 5:
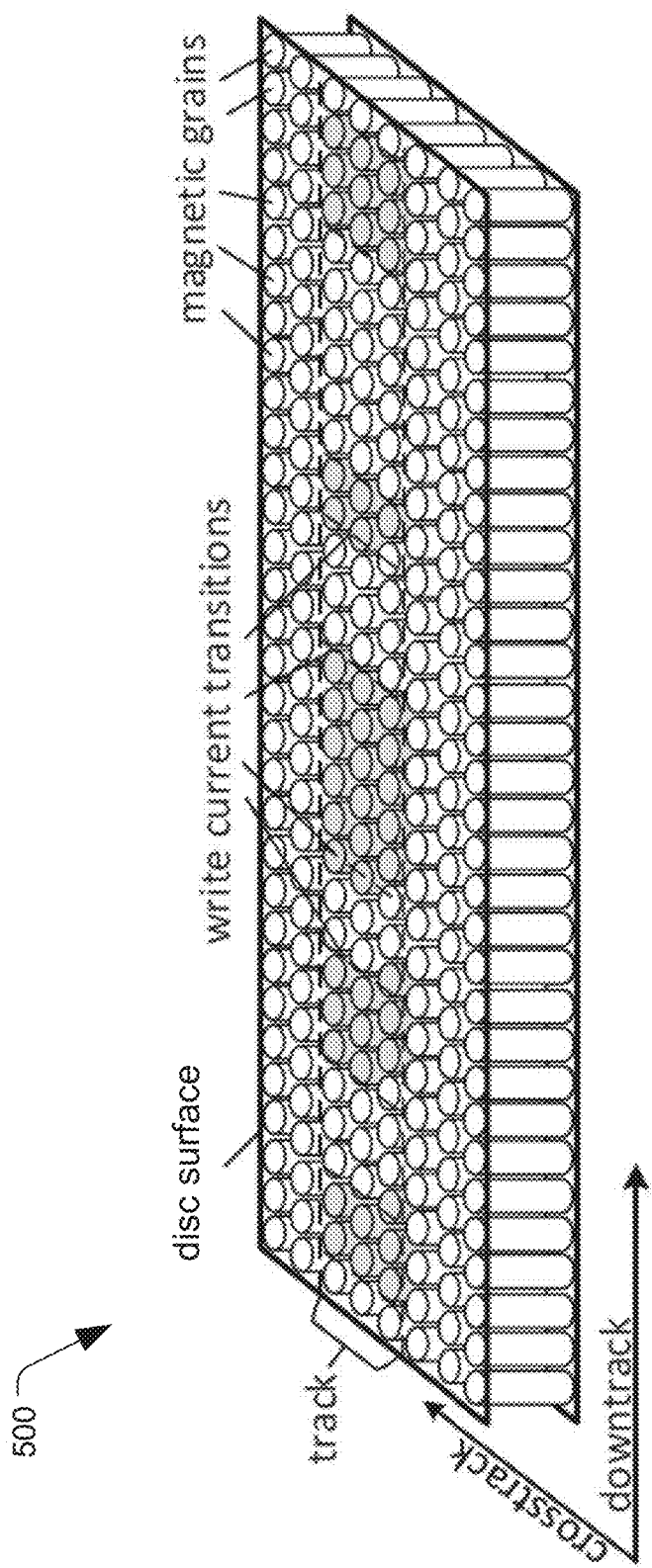
FIG. 5 is a diagram of a system of continuous media, in accordance with certain embodiments of the present disclosure.

FIG. 5 shows a diagram of a system 500 of a magnified, cross-sectional, isometric representation of continuous media. As depicted for system 500, continuous media can consist of a large number of magnetic grains which are shown as cylinders with tops that are flush with the surface of the disc. These magnetic grains have polarities that can be oriented during a write operation. As the easy axis of these magnetic grains are perpendicular to the surface of the disc, each grain's polarity can be oriented in either the "up" or "down" direction. As discussed earlier, the surface of magnetic grains of continuous media allow the locations along a track in which the media changes polarity to be governed only by the locations of the write current transitions relative to the media. The hallmark of continuous media is that the width of the written track is governed only by the width of the write head, and the locations along a track in which the media changes polarity are governed only by the locations of the write current transitions relative to the media. As a result, the bits written to the media can, and do, shift around each time a track is written; thus, there is no fixed relation of a particular bit to a position on the continuous media. If the write current was, for example, shifted by the amount of time it takes the media to move the diameter of a single grain, the whole written sequence would shift by approximately 1 grain. As the demodulation of data written to the media always begins with a synchronization procedure to locate the start of a written data sequence, this will have little effect on the data recovery operation. For at least these reasons, continuous media does not encounter the problem associated with misalignment of a write current transition that can occur with patterned media.

Figure 6:
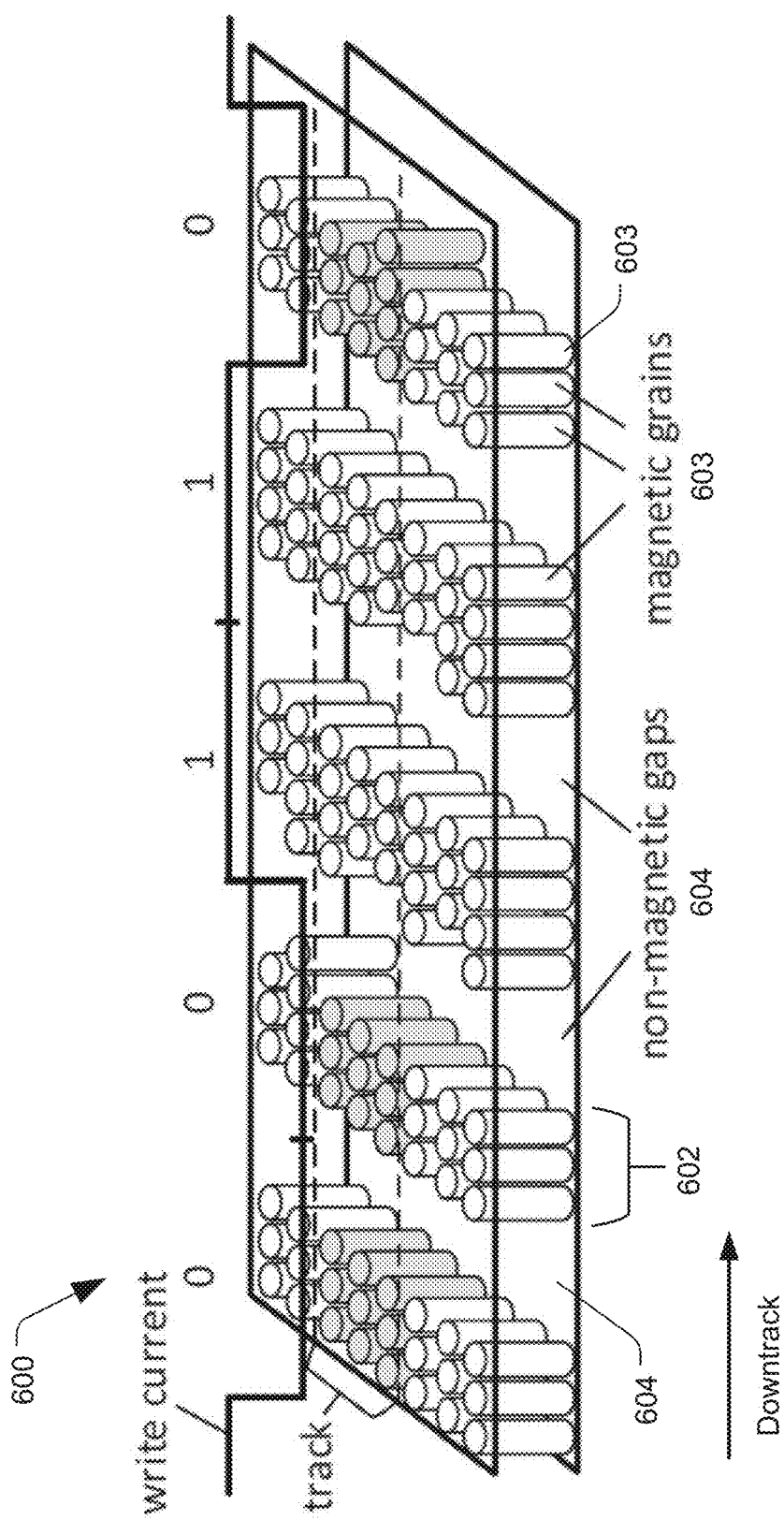
FIG. 6 is a diagram of a system for synchronous writing of patterned media, in accordance with certain embodiments of the present disclosure.

FIG. 6 shows a magnified, cross-sectional, isometric representation of system 600 with grain patterned media, which could be implemented as disc 109, disc 206, or disc 400, in which media features 602 are segregated in the downtrack direction by non-magnetic material 604. Patterned media generally refers to media in which there is a fixed relation of written bits to the media itself. In system 600, magnetic material has been removed between media features 602 and, thus, a bit's width is defined by the width of the write head but the bit's length can be patterned into the media (e.g., consisting of approximately 3-4 rows (or more or less) of magnetic grains per bit in some examples). Each of the media features 602 may include one or more grains 603. Further, one or more grains 603 may be utilized to store a bit in the down track direction. In some embodiments, a disc with grain patterned media features may be homogenous, that is, it has a uniform structure, or nearly uniform structure, of patterned media features throughout a track of the disc or the throughout the entire disc. When a disc has a homogenous media feature pattern, a distinction between the servo region and data region of a track may not be able to be ascertained from merely a visual examination of the disc. Such is contrary to previous bit patterned media incarnations, in which the servo regions had patterns that were visually distinct from the data regions (e.g., in bit patterned media, the servo portion contained diagonal line patterns rather than dots that the data region contained, which allowed one to look at the media and immediately tell where the servo was located).

Figure 7A:
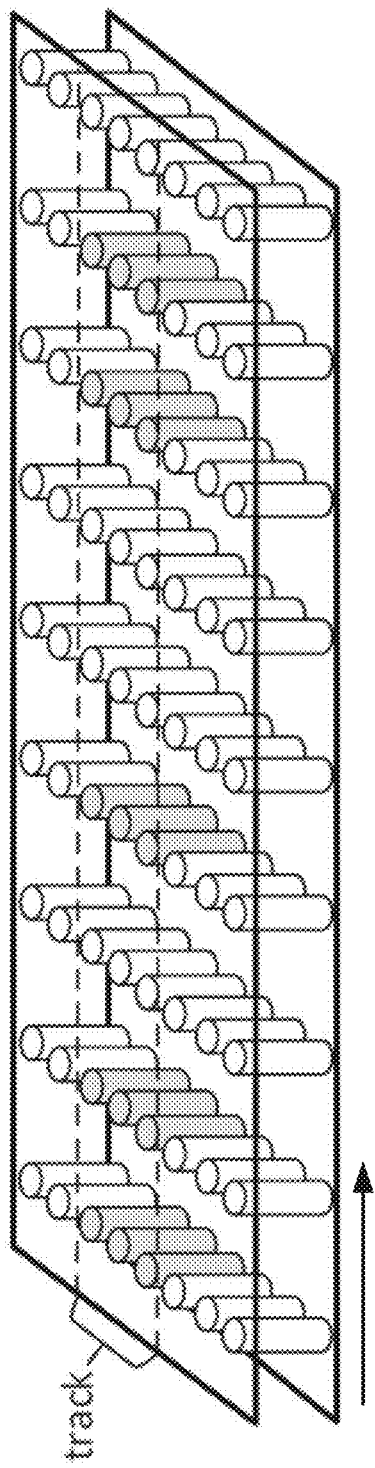
FIG. 7A is a diagram of a system for synchronous writing of patterned media, in accordance with certain embodiments of the present disclosure.
Figure 7B:
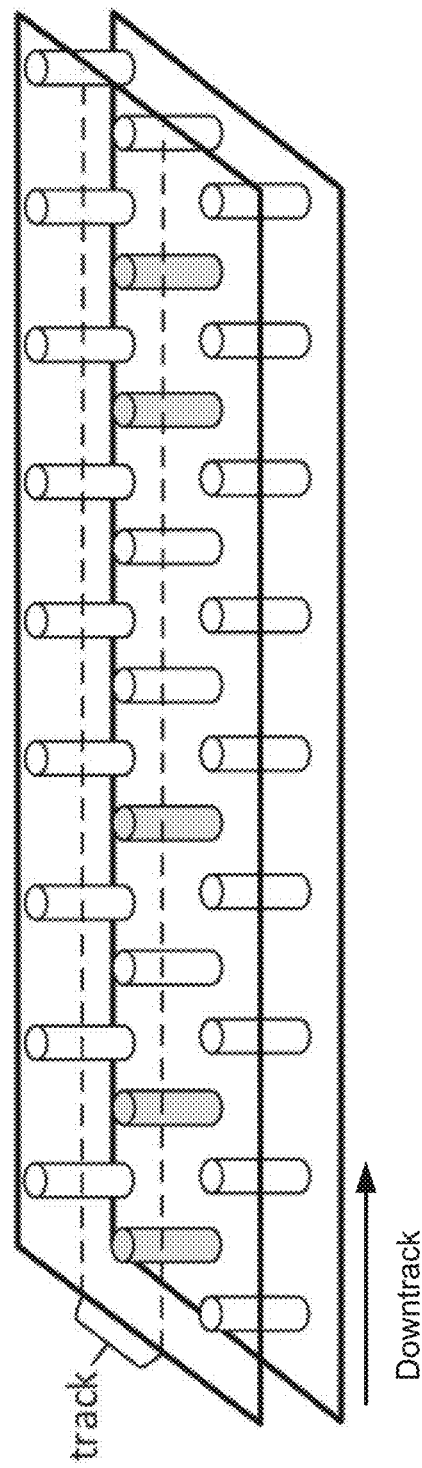
FIG. 7B is a diagram of a system for synchronous writing of patterned media, in accordance with certain embodiments of the present disclosure.

In some examples, more than one bit may be encoded into a media feature having adjacent grains between consecutive non-magnetic gaps; that is, a write current transition could occur over a media feature such that multiple bits are encoded in the group of physically adjacent grains. For example, referring to FIG. 6, a media feature 602 may have three or four magnetic grains as shown, where such a media feature with multiple magnetic grains may be utilized to store multiple bits by having a write transition over the corresponding media feature that is between the grains to which the bits are assigned. In some examples, the write transition can happen precisely between adjacent grains or can happened over a specific grain, which does not itself store a data bit, allowing data bits to be stored in the grains on each opposite side of the transition. Other example versions of ordered grain patterning are depicted in FIG. 7A and FIG. 7B. It should be clear that, for all of these examples, the relative position of the write current to the media surface matters. In the systems discussed herein, the write current can transition between levels in between these rows of grains over the non-magnetic regions or between bit locations of the adjacent magnetic media patterns. If this were not the case and the write current were to transition directly over a bit location of the magnetic media patterns, a bit may take on either polarity with equal probability, thus making the bit's state indeterminate. A bit, therefore, may not be properly recorded by a misalignment of the write current to the media and, thus, care must be taken to correctly align the write current to the patterning of the media.

FIG. 7A depicts a patterned media example in which the media features, and thus a bit, each correspond to a single row of magnetic grains, where there may be multiple magnetic grains within a single bit in the cross-track direction, such as also shown in FIG. 6. For example, the adjacent groups of shaded grains (in the depicted example, the track width comprises three grains; however, the number of grains could vary based on the head width) in the track outline in FIG. 7A each represent a single bit. FIG. 7B depicts a patterned media example in which each bit is recorded to a single magnetic grain that is not physically adjacent to other grains either in the downtrack or cross-track directions.

Figure 8:
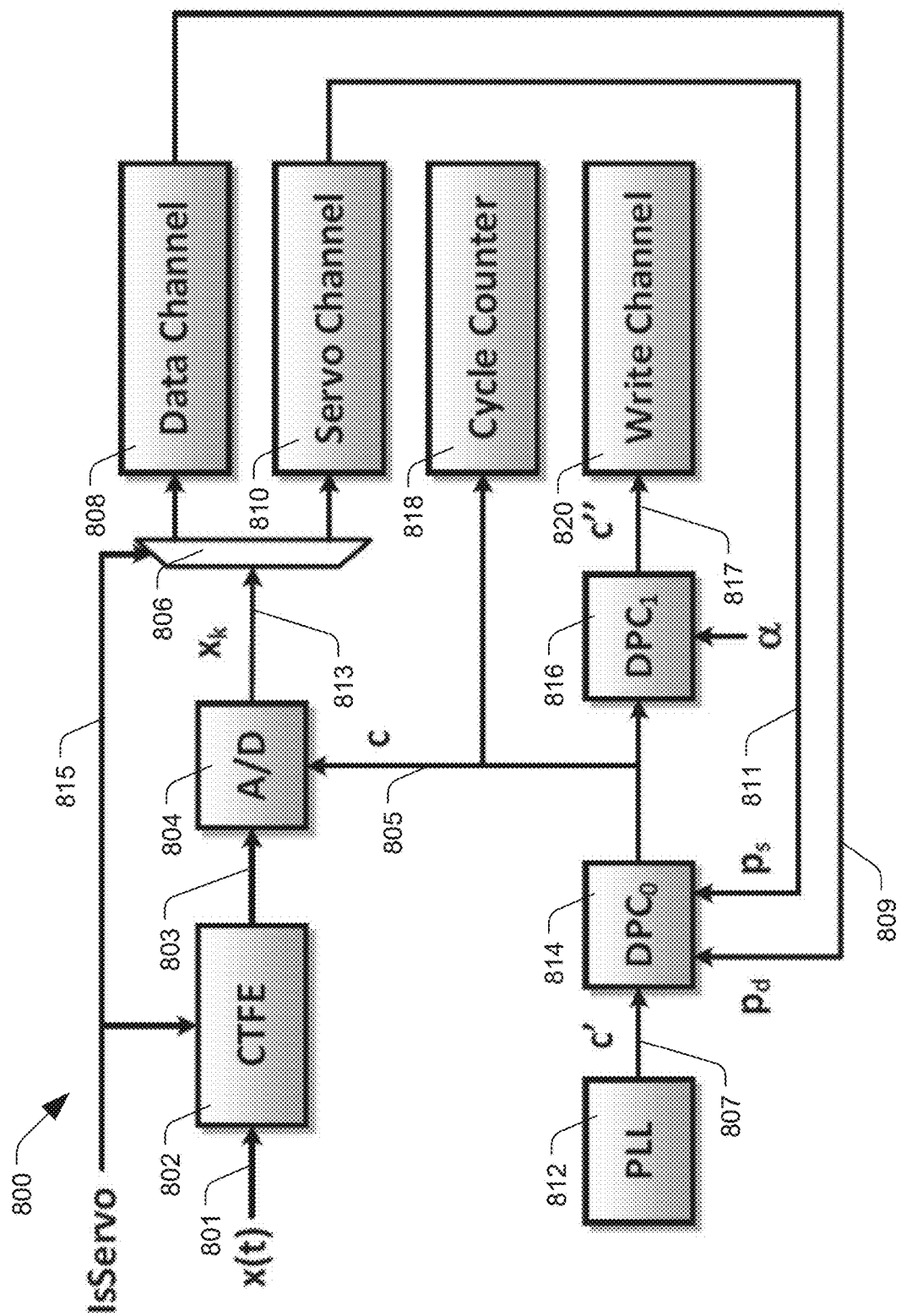
FIG. 8 is a diagram of a system for synchronous writing of patterned media, in accordance with certain embodiments of the present disclosure.

FIG. 8 shows a diagram of a system 800 for synchronous writing of patterned media, in accordance with certain embodiments of the present disclosure. System 800 can include a continuous time front end (CTFE) 802, an analog-to-digital (A/D) converter circuit 804, a selection circuit 806, a data channel 808, a servo channel 810, a phase locked loop (PLL) circuit 812, a first digital-to-phase converter (DPC) circuit 814, a second DPC circuit 816, a cycle counter 818, and a write channel 820.

As discussed herein, from a system perspective, one of the most difficult problems encountered in working with patterned media is the ability to conduct reliable write operations. As shown in FIG. 6, this requires that the write current be stable (not in transition) over the feature(s) to which each bit is recorded and, thus, it must only transition over precise locations (e.g., the non-magnetic portions of the media that separate adjacent magnetic features or between bit locations within the media features). With this in mind, FIG. 8 presents an architecture for a system and its associated clocking that may be used to achieve such a synchronization of the write current to the patterning of the media.

The following improvements can be present in the system. First, the media patterning in the disc can be homogenous around an entire revolution for each track such that the servo wedges and data areas have the same, or nearly the same, media grain patterning. However, the patterning may not be equivalent for all tracks on a disk but, in practice, it is often the case that groups of tracks at similar radii will have similar patterning. Although this may seem like a natural requirement, it is actually a drastic departure from previous incarnations of patterned media in which the servo and data regions of the disk were patterned separately with a different bit density. As discussed herein, the proposed consistency of media patterning between servo and data regions is beneficial to conducting writes synchronous with the media. Second, the servo pattern, which can be written to the disc during manufacturing, should be written synchronously with the media patterning. A method of self-servo write, in which an embedded hard-disc controller is used to write servo patterns to the disc, may be utilized to produce a disc with the servo patterns discussed herein.

Although the first improvement results in grain patterning equivalency between servo and data regions of the disk, the implementations discussed herein allow for multiple features in the downtrack direction to correspond to one or more bits, and for that number to differ between servo and data regions. For example, a servo bit may be comprised of Ns consecutive downtrack grains whereas a data bit may be comprised of Nd downtrack grains. Further, the written servo and data patterns can be an integer multiple of the grain patterning, for example, each written servo bit could use three consecutive grains and each data bit could use two consecutive grains. This can allow the system to use a single clock that is consistent with a single media feature of the media patterning for the entire system, which includes the servo regions and the data regions. Thus, a single, common clock can be utilized for all write and read operations for both servo and data regions; that is, the systems and processes disclosed herein allow for a single clock to be used to read a servo sector and to write a data sector. In some examples, a clock with a frequency consistent with a single media feature may be utilized where, during a write, each written data bit is repeated Nd times and, during a read, the generated samples may be processed as oversampled (e.g., no down-sampling) or down-sampled signals (e.g., down-sampled by Ns and Nd) for processing by the servo 810 and data 808 channels, respectively.

We note that this, in fact, is not what is typically done on continuous media, such as shown in FIG. 5. For continuous media, the frequencies used for reading servo and writing data generally have no simple relationship with each other and, thus, the utilized clocks must be generated by different sources, resulting in at least two clocks for these operations in a continuous media system. In much of the discussion that follows, the case of Ns=Nd=1 is presented, however, it may be easily generalized to arbitrary values of Ns and Nd and, thus, this is not a limitation of the embodiments discussed herein.

Assuming the improvements discussed above are implemented, the read-back signal x(t) 801 can be applied to an input of the CTFE 802 for processing, which can include implementing an equalization circuit to produce an equalized input signal 803 that can be subsequently sampled by the A/D converter circuit 804. The clock (c) signal 805 applied to the A/D converter circuit 804 can control the sampling thereof and may be generated by a single PLL circuit 812 passed through a DPC module 814 to shift the output clock (c) 805 phase relative to the input clock (c') 807 phase based on one or more applied control signal(s), such as first control signal 809 or second control signal 811 or both. The resulting sampled data sequence $(X_k)$ 813 can then be applied to the appropriate subsystem, via selection circuit 806 (e.g., a multiplexer) as determined based on the position signal 815, for demodulation. Position signal 815 may be received from a servo subsystem and can indicate whether the write head is over a data region or a servo region. Further, some parameters of the CTFE 802 may be selected based on whether a servo or data field is being demodulated.

The position signal 815 can be generated from a formatter hardware block (e.g., a circuit within an integrated circuit package) that asserts the position signal 815 when the read head is over a servo sector. In turn, the data that is read from the servo sector by the servo channel can be provided to the formatter circuit to determine a next location to assert the position signal 815.

In some embodiments, a relative position of a read head to the media can be ascertained through a demodulation the read-back signal over servo wedges. As the read head passes over a servo wedge, the generated sample sequence $(X_k)$ 813 can be used to determine a relative alignment of the sampling clock (c) 805 to the written servo pattern. In further embodiments, this can be accomplished using a specific pattern preceding each servo wedge that can provide timing information. For example, if the clock (c) 805 phase was delayed or advanced by any fraction of its period, the resulting sequence of samples would also reflect this change. As a result, the servo channel 810 may selectively generate a control signal $(p_s)$ 811 for application to the first DPC module 814 to correct any deviation in the observed clock phase from a desired clock phase. In this way, the phase of the clock (c) 805 may be corrected for each servo wedge to maintain a consistent alignment with the servo read-back waveform.

Because the servo waveform is written synchronously with the media patterning, adjusting the clock phase to maintain a desired alignment with the read-back waveform also acts to maintain a consistent alignment of the clock (c) 805 with the media patterning itself. Furthermore, when the homogeneity of media patterning exists, as discussed above, achieving an intended alignment with the features to which the servo pattern is written also maintains the same alignment with the features that follow in the data region. Simply put, once the clock (c) 805 is aligned to the servo media features it is also aligned to the subsequent data media features. As was the case for servo wedge demodulation, the read-back samples themselves $(X_k)$ 813 can contain timing information which may be used to adjust the read clock to any desired sampling phase, for the data channel 808 this control is denoted by first control signal (pa) 809 in FIG. 8.

Figure 9:
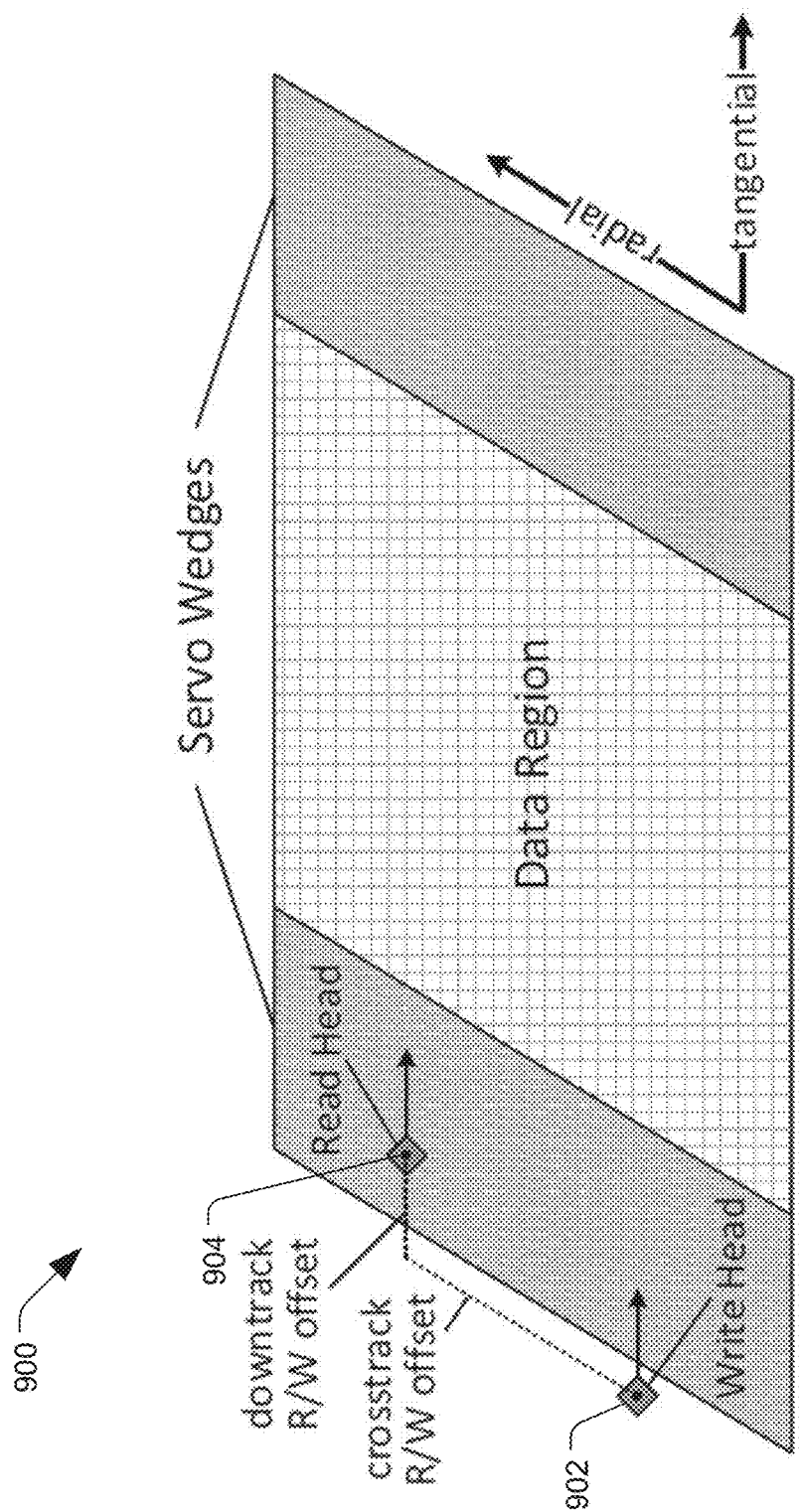
FIG. 9 is a diagram of a data region disposed between two servo wedges in a system for synchronous writing of patterned media, in accordance with certain embodiments of the present disclosure.

However, as illustrated in FIG. 9, although the write head 902 and the read head 904 are on a same slider (not shown) and they are physically separated by a distance which can be conveniently described into its, orthogonal, downtrack and crosstrack components. The downtrack component (downtrack R/W offset) is important as it gives rise to an offset in the alignment of the clock used for writing relative to the media. This downtrack offset, which is a strong function of the radial position on the disk, can be calibrated in terms of clock cycles and, thus, we can utilize a second DPC 816 to generate a write clock (c") 817 that is synchronous to the media. The second DPC 816 can be programmed with a control signal (a) to implement a static delay, which can result in an overall delay of clock cycles between the write and read clocks relative to the media. As a result of the read clock synchronization to the media, the write clock would also be synchronized to the media patterning by this selection. The control signal (a) can be an integer delay between the read and write heads that could easily be accounted for by delaying the start of any write operation appropriately (e.g., the clock cycle counter 818 can be implemented to track any integer clock cycle delays).

Using the approach detailed above, it is possible to start a write operation following a servo wedge using a clock that is synchronous with the media patterning. Conducting write operations on patterned media, however, is quite a bit more complicated than read operations in that a read-back signal is not observable while a write is being conducted. As such, during write operations the relative position of the clock and the media is only periodically observable when servo wedges are encountered, times at which the write ceases in favor of the servo wedge read and demodulation. The process of maintaining alignment with the media throughout a write operation is a difficult process. To address this, a disk locked clock (DLC) can be implemented.

Figure 10:
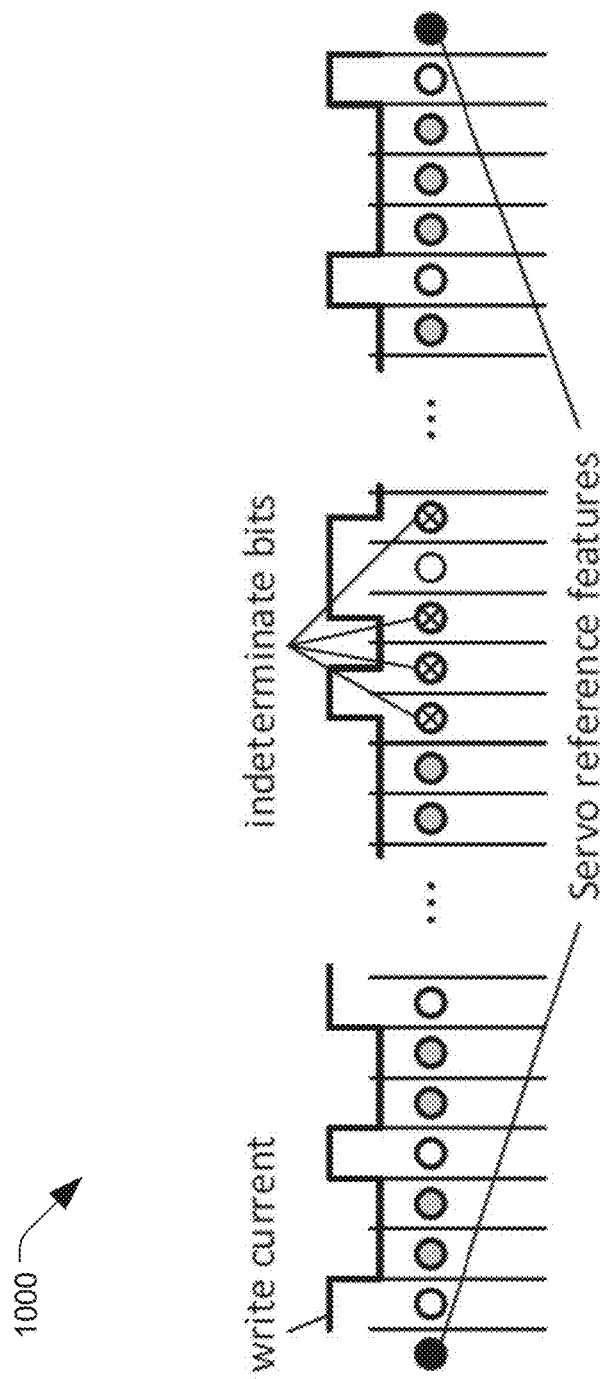
FIG. 10 is a diagram of a data region disposed between two servo wedges in a system for synchronous writing of patterned media, in accordance with certain embodiments of the present disclosure.

As depicted in FIG. 10, an example is provided of a problematic situation that can occur in a system having write current alignment with media patterning when one more clock cycle than media feature exists between adjacent servo reference features. Such a problem can result in, for example, midway through the data wedge, the write current transitions would occur centered on the media features, giving each feature a 50% probability of taking on either of the actual intended polarity. Such an occurrence would cause a large number of data bits near the center of the data wedge to take on indeterminate values, which could significantly compromise the integrity of the written data sequence. The solutions provided herein solve such problems.

To solve these problems, a system can be implemented to calibrate the actual number of media features and grains separating servo reference features for each pair of consecutive servo wedges for all tracks on a disc. The calibrated values can then be stored, such as being written into each servo wedge or stored in another accessible memory, such that they are available to the hard-disk controller or SWM during servo wedge demodulation. In addition to being used as target counts to which the observed number of clock cycles separating adjacent servo wedges can be compared, during write operations these values can be used to determine the integrity of the data written to the preceding data wedge. In the event that the count differs too significantly from the calibrated value (such as one larger in the example provided in FIG. 10), the data written to the preceding data region may be considered corrupted and, thus, may require data integrity operations to occur to increase its reliability, such as rewriting a corrupted data region.

Figure 11:
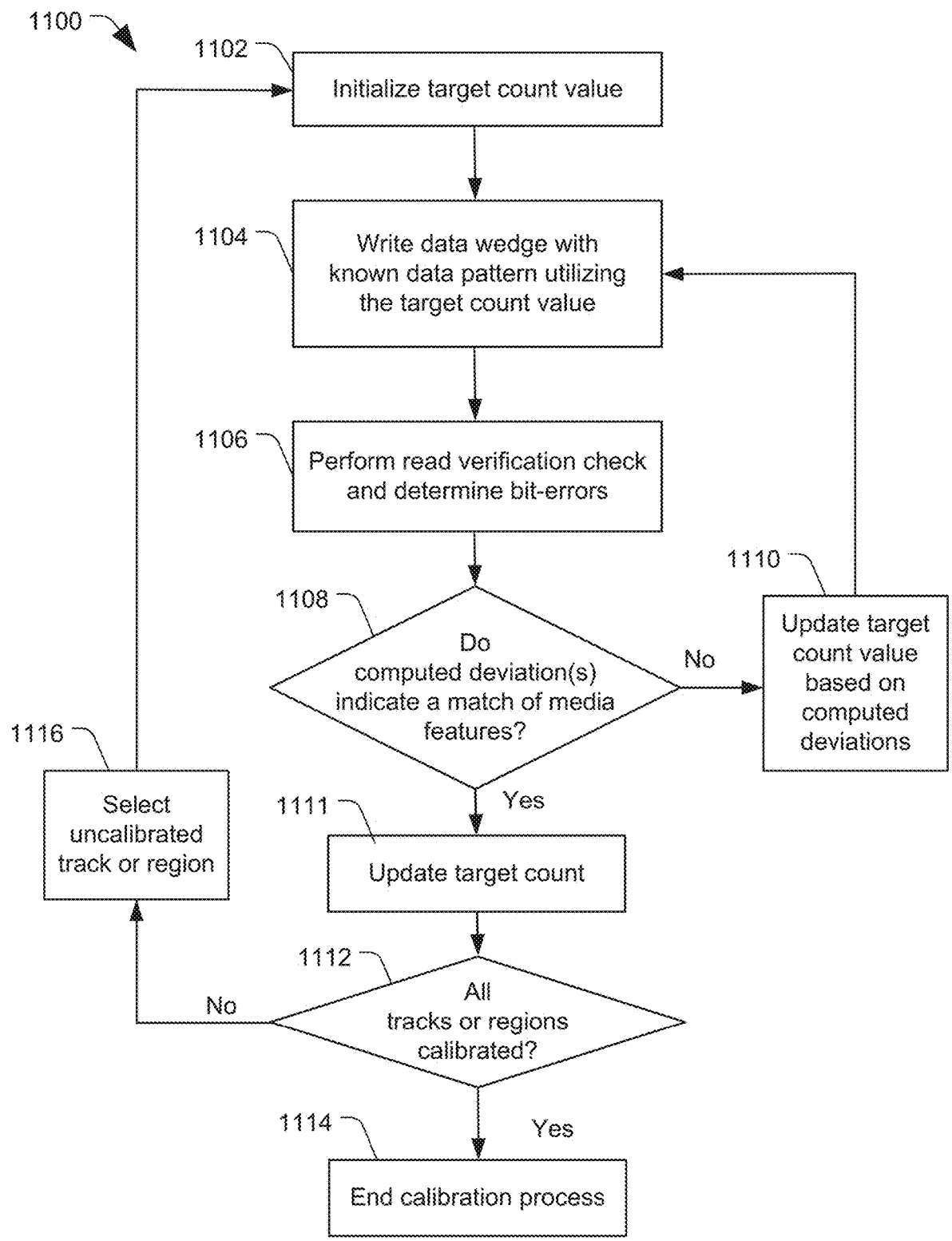
FIG. 11 is a diagram of a process for synchronous writing of patterned media, in accordance with certain embodiments of the present disclosure.

FIG. 11 shows a process for calibration of media features and grains on patterned media, generally designated 1100. The process 1100 can be implemented by the system 100, SWM 130, the system 1200, or any combination thereof. The calibration process 1100 can include an iterative approach based on deviations of a bit sequence. The process 1100 can begin with a target count value being initialized to a nominal value, at 1102. The target count is representative of a number of bits stored in the media features expected between servo wedges. Then, a data wedge write can be conducted with a known data pattern utilizing the target count value, at 1104. After writing, a read verification check operation can be performed and deviation(s) (errors) of the detected bit sequence from the written bit sequence can be computed, at 1106. Once the errors are calculated, the process 1100 can determine whether the detected errors indicate a match of media features, at 1108. In some examples, this can be accomplished by determining errors between the detected bit sequence and the known bit sequence from the written data pattern. Multiple bit-error counters and a delay line may be utilized, as described herein, to determine which of the counters shows the least errors, where each counter represents a different count of media features in a data region. When the observed count does not match the target count value, at 1108, (e.g., such as when a counter with the lowest stored value represents a count of media features other than the target count value) the process may then update the target count value based on the deviation(s) (e.g., the system can adjust the target count value based on which specific bit-error counter had the lowest count value), at 1110, and repeat the process at 1104. The process 1100 may perform iterations of adjusting the target count value and the computing deviation(s), as described, until either a limit of a number of iterations has been reached or the computed deviation(s) match the target count value, at 1108. When the computed deviation(s) match the target count value, the process 1100 may then store the final target count for the associated track or region, at 1111.

The method 1100 may then determine if all tracks or regions of a disc have been calibrated, at 1112. When all calibration is finished, the process 1100 may end, at 1114. When another track of region needs to be calibrated, the process 1100 may select to calibrate the corresponding track or region, at 1116, and repeat the process 1100. The calibration process 1100 may be applied to all or a portion less than all of a disc, as determined by the requirements of a system.

Generally, the iterative procedure 1100 can continue until a target count for each track or region is determined which allows for a reliable write, by matching the target count value to the number of media features separating the servo reference features of the surrounding servo wedges. For example, this allows a disc drive system or data storage controller to know, such as via a stored lookup table or data stored within a servo wedge, an expected number of patterned media features between specific servo wedges of a specific track.

Figure 12:
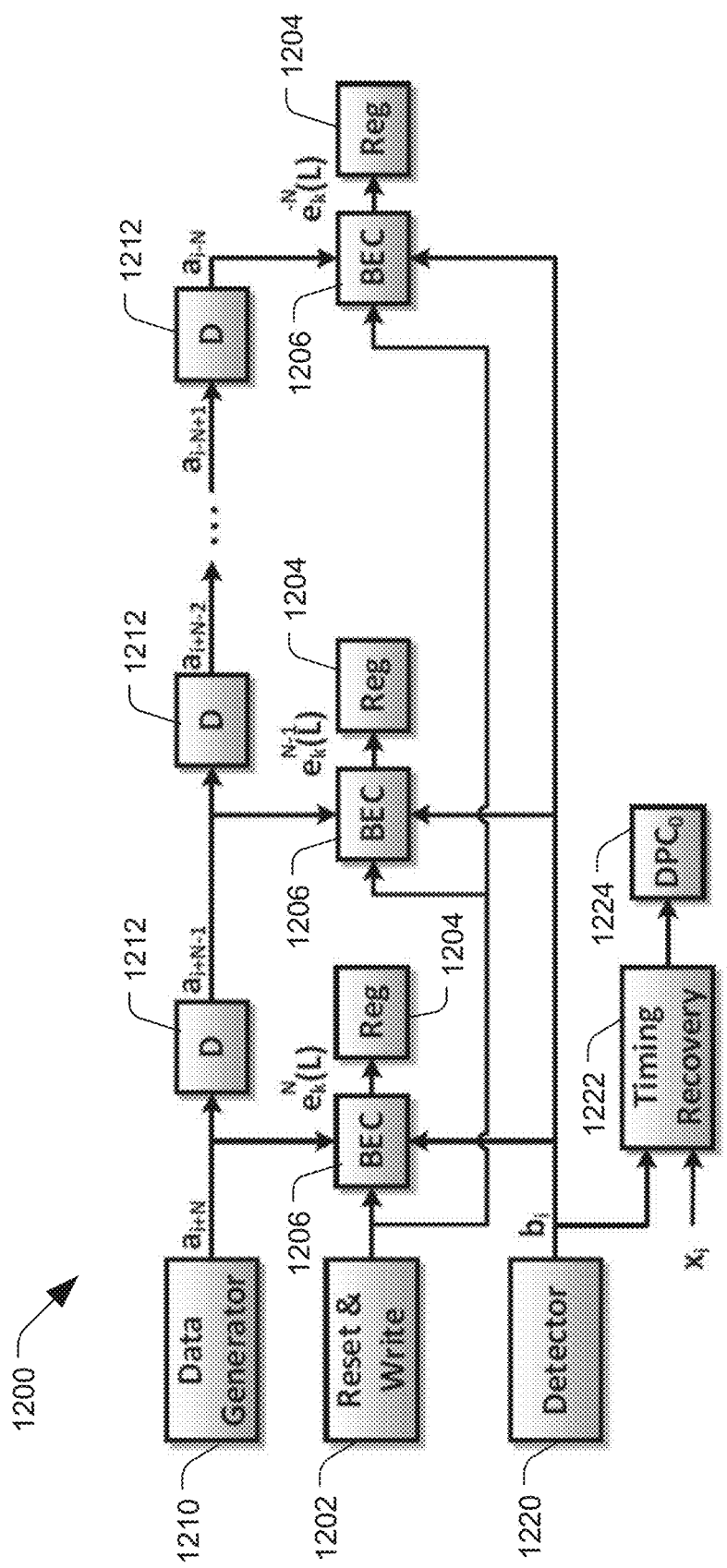
FIG. 12 is a diagram of a system for synchronous writing of patterned media, in accordance with certain embodiments of the present disclosure.

Referring to FIG. 12, generally, a diagram of a system 1200 for synchronous writing of patterned media is shown; specifically, system 1200 shows a system architecture that can implement a grain patterned media calibration method. The system 1200 can compute differences between a detected bit sequence (b) and multiple shifts (via delay line 1212) of a written (known) bit sequence (a). In some embodiments, the architecture shown in FIG. 12 may implement the process 1100.

The system 1200 can implement a set of counters 1206 to count differences between the detected bit sequence (b) and multiple shifts of the written data sequence (a) to obtain additional the information for the above process 1100. The system 1200 may implement and be represented by the following set of equations.

$$e_k^M(L) = \sum_{i=kL}^{(k+1)L-1} (b_i \neq a_{i+M}), M = \{-N, \ldots, N\}$$

A control module 1202 can control multiple bit-error counters (BEC) 1206 such that a number of differences observed in non-overlapping windows of length L may be stored to registers (Reg) 1204. To provide temporal resolution for the integrity of a write operation, the system 1200 can sum each of the difference computations over non-overlapping windows of length L and save the results to the registers 1204.

In some embodiments, system 1200 can be utilized for carrying out the above described computations in which the written data sequence (a) produced by the data generator 1210 is applied to a delay-line 1212 to compute the number of differences between its shifts and the detected bit sequence (b) from the detector 1220. A control module, such as reset and write module 1202, can count the number of bits processed such that, every L bits, the current values in the bit-error counters (BEC) 1206 may be written to registers (REG) 1204 and reset for the next block of computation. A reset may be performed for each data region that is calibrated.

The detected bit sequence (b) can also be provided to a timing recovery module 1222 and used for a timing recovery process. The timing recovery module 1222 can produce a result that can be applied to a DPC 1224, which can be DPC 814, to make timing adjustments to the clock signal from a PLL. Generally, the detector 1220 will generate decisions consistent with whatever pattern was written to the disc, whether it was correct or not. As a result, this operation will generate a single sample per media feature, whereas without the aid of timing recovery the read clock behavior will largely track the behavior of the write clock, which will not provide the desired results. Using the written data sequence (a) as input to timing recovery will also not produce the desired results as it is capable of tracking out (compensating for) missed media features, potentially making an errant write operation look as though it was conducted correctly.

The system 1200 can be implemented during manufacture to calibrate a grain patterned media storage device, where the count of bits between servo wedges, on a per track or per region basis, would be a calibrated value stored in memory. Further, the system 1200, as well as the system 800, can also be implemented via a circuit or chip within a grain patterned media data storage device. For example, the system 1200 can be implemented within a detector of data channel 808 for use during operation of the data storage device 100.

In some embodiments, servo read data samples can go to the servo channel that has a disc locked clock with a cycle counter. The servo wedge can be parsed to obtain a count of expected grains; the count can then be used to adjust the phase of the read operation over the next data portion based on a comparison of the counted media grains in the servo wedge versus an expected number of media grains in the servo wedge.

Figure 13:
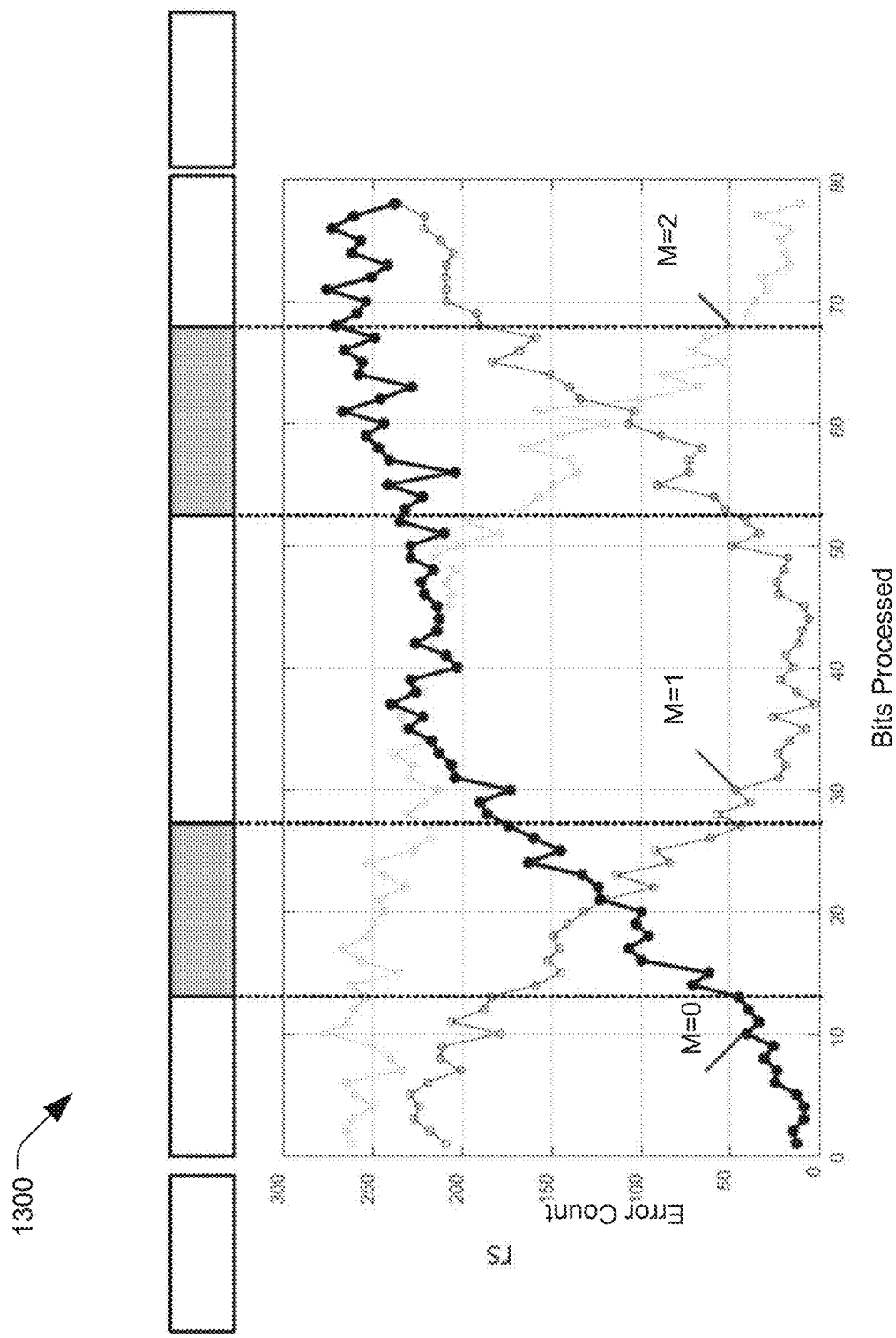
FIG. 13 is a diagram of example bit-error counters in a system for synchronous writing of patterned media, in accordance with certain embodiments of the present disclosure.

The utility of the system 1200 and the counters 1206 is illustrated in FIG. 13 which depicts an example situation in which the observed count between reference features in adjacent servo wedges is two (2) larger than the actual number of media features present on the specific disc region. In this example, the data wedge is read back and the bit-error counters, as given by equation (1), are depicted for L=500 and M=0, 1, 2. At the start of the data wedge, the M=0 counter is low, which is expected as the write will begin the write current synchronous to the media patterning. As the read progresses, however, it quickly enters into the first gray zone, in which no error count is low. Here the read has encountered a situation in which the write current transitions are occurring directly over the center of the media features (such as shown in FIG. 10), producing indeterminate results each time the write current transitions. As time progresses, however, the write current transitions drift back to between the media features, however, a full feature slip causes the M=1 counter to drop in value. As shown, this occurs one more time as the write current transitions into a gray zone followed by the M=2 counters dropping in value. Note that, each time a region is entered in which the write current transitions between media features a single bit-error counter transitions into a low value. As illustrated in FIG. 13, the progression of the write current's alignment to the media patterning can be easily tracked using the proposed bit-error counters. In the shown example, exactly 2 more features were encountered than expected as the data wedge begins with low M=0 counters (as preferred) and ends with low M=2 counters. As a result, during the calibration process, the target count can be adjusted by 2 and the data wedge rewritten and checked for integrity.

In some embodiments, a minimum of 3 counters can be implemented (e.g., for M=−1, 0, 1). In the case of the provided example, the lack of the M=2 counter would not allow one to immediately understand that the observed count was 2 larger than the number of features, but the M=0 and M=1 curves would indicate that the count was at least 1 high. If enough counters are implemented to observe a correct alignment at the completion of the data wedge, the correct count can be immediately apparent, whereas implementing fewer counters, while possible, would require additional iterative steps where the target count is progressed towards its final, correct, value. Thus, depending on the requirements and constraints of a system, different embodiments may implement different numbers of counters to achieve the results described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a control circuit configured to:
      manage read operations and write operations to a grain patterned data storage medium having a track with a homogenous media feature pattern for the entirety of the track, the track including a servo region and a data region;
      adjust a clock frequency and phase based on a read in the servo region to maintain a desired alignment for a write in the data region;
   a calibration circuit configured to:
      determine multiple bit-error calculations based on the data region;
      determine a count of media patterns within the data region based on the multiple bit-error calculations;
      store the count of media patterns to enable synchronous writing of the data region; and
   a single, common clock utilized for all write operations and read operations to both the servo region and the data region.

2. The apparatus of claim 1 further comprising the apparatus is a data storage device including the grain patterned data storage medium, the control circuit, and a clock generation circuit configured to provide the single, common clock.

3. The apparatus of claim 1 further comprising a phase locked loop circuit configured to provide the single, common clock.

4. The apparatus of claim 1 comprising the control circuit further configured to:
   determine when an observed number of clock cycles during a write in the data region does not equal an expected number of clock cycles for the data region; and
   when the observed number of clock cycles does not equal the expected number of clock cycles, rewrite the data region.

5. The apparatus of claim 4 further comprising:
   a clock cycle counter configured to store the observed number of clock cycles;
   the servo region configured to store the expected number of clock cycles; and
   the control circuit configured to count the observed number of clock cycles via the clock cycle counter and receive the expected number of clock cycles from a read of the servo region.

6. The apparatus of claim 1 comprising the calibration circuit includes:
   a detector circuit configured to detect a bit sequence read from the data region;

a data generator circuit configured to generate bits of a known data pattern;
multiple bit-error counters, each configured to compare a bit of the known data pattern to a bit of the detected bit sequence and count a number of differences observed; and
a modification circuit configured to modify a count of grain patterns between two servo wedges of the grain patterned data storage medium based on the counts of the numbers of differences observed, the modification circuit further configured to store a modified count of grain patterns to enable synchronous writing of the grain patterned data storage medium.

7. The apparatus of claim 6 further comprising:
multiple registers associated with the multiple bit-error counters; and
a delay line shift coupled to the multiple bit-error counters after a first bit-error counter;
a control module configured to, for each of the multiple bit-error counters, periodically store the count of the number of differences observed in one of the multiple registers such that there is a count stored in a different register for each count period from each bit-error counter; and
the modification circuit configured to determine the count of media patterns within the data region based on the counts stored in the registers.

8. The apparatus of claim 7 further comprising the multiple bit-error counters include at least three bit-error counters.

9. The apparatus of claim 7 comprising the control circuit further configured to adjust the clock frequency and phase to be synchronous with the media features based on the modified count of grain patterns.

10. A method comprising:
managing read operations and write operations to a grain patterned data storage medium having a track with a homogenous media feature pattern for the entirety of the track, the track including a servo region and a data region;
determining multiple bit-error calculations based on the data region;
determining a count of media patterns within the data region based on the multiple bit-error calculations;
storing the count of media patterns to enable synchronous writing of the data region; and
adjusting a clock frequency and phase to maintain a desired alignment for a write in the data region based on a read in the servo region.

11. The method of claim 10 further comprising:
providing a single, common clock signal for write operations to the data region and read operations to the servo region.

12. The method of claim 11 further comprising the single, common clock is provided via a clock generation circuit.

13. The method of claim 12 further comprising the clock generation circuit includes a phase locked loop circuit.

14. The method of claim 11 further comprising:
determining when an observed number of clock cycles during a write in the data region does not equal an expected number of clock cycles for the data region; and
when the observed number of clock cycles does not equal the expected number of clock cycles, rewriting the data region.

15. The method of claim 14 further comprising:
storing the observed number of clock cycles in a counter;
storing the expected number of clock cycles in the servo region; and
counting the observed number of clock cycles via the counter and receiving the expected number of clock cycles due to a read of the servo region.

16. The method of claim 10 further comprising:
detecting a bit sequence of the data region;
generating bits of a known data pattern;
comparing a bit of the known data pattern to a bit of the detected bit sequence and counting a number of differences observed; and
modifying a count of grain patterns between two servo wedges of the grain patterned data storage medium based on the counts of the numbers of differences observed, the modification circuit further configured to store a modified count of grain patterns to enable synchronous writing of the grain patterned data storage medium.

17. The method of claim 16 further comprising:
utilizing multiple registers associated with multiple bit-error counters; and
for each of the multiple bit-error counters, periodically storing, in one of the multiple registers, the count of the number of differences observed, such that there is a count stored in a different register for each count period from each bit-error counter; and
determining the count of media patterns within the data region based on the counts stored in the registers.

18. The apparatus of claim 16 further comprising adjusting the clock frequency and phase to be synchronous with the media features based on the modified count of grain patterns.

19. The method of claim 16 further comprising the multiple bit-error counters includes at least three counters including a first counter representing the known data pattern, a second counter representing a first shift of the known data pattern, and a third counter representing a second shift of the known data pattern.

20. A device comprising:
a circuit configured to:
manage a read operation and a write operation to a grain patterned data storage disc having a track with a homogenous media feature pattern for the entirety of the track, the track including a servo region and a data region;
adjust a clock phase based on a read in the servo region to maintain a desired alignment for a write in the data region, and
a servo channel configured to read servo information from a servo wedge of the grain patterned data storage disc, the servo channel including a disc locked clock with a cycle counter where the servo channel can parse a servo wedge to obtain a count of grain patterns, where the count of grain patterns can then be used to adjust a phase of an operation over a next data portion based on a comparison of the count of grain patterns in the servo wedge versus an expected number of grain patterns in the servo wedge.

21. The device of claim 20 further comprising a single, common clock utilized for a write operation to the data region and a read operation to the servo region.

22. The device of claim 20 further comprising the circuit including:
a continuous time front end (CTFE) circuit configured to:
receive an analog read signal corresponding to the grain patterned data storage disc;

process the analog read signal to generate a modified analog signal;

an analog to digital converter (A/D) circuit configured to receive the modified analog signal and generate digital samples from the modified analog signal;

a phase locked loop (PLL) circuit configured to generate a first clock signal;

a first digital phase converter (DPC) circuit configured to:
generate a second clock signal by phase shifting the first clock signal based on an applied control signal;
provide the second clock signal to the A/D circuit to control the generating of the digital samples;

a write channel configured to synchronously write data to the data areas of the grain patterned medium based on the second clock signal; and the servo channel configured to read servo information from a servo wedge based on the second clock signal.

23. The device of claim 22 comprising the circuit further including a clock cycle counter circuit configured to track a clock cycle delay that indicates a misalignment between the first clock signal and the grain patterns on the grain patterned data storage disc.

24. The device of claim 23 comprising the circuit further including a timing recovery circuit configured to adjust, via the applied control signal, the phase of the second clock signal to maintain a desired alignment with the analog read signal.

25. The device of claim 24 further comprising the applied control signal is a desired sampling phase of the write channel.

26. The device of claim 24 further comprising the applied control signal is received from the servo channel and applied to the first DPC circuit to correct deviation in an observed clock phase from a desired clock phase to adjust the phase of the first clock signal for each servo wedge to maintain a consistent alignment with a servo read-back waveform.

27. The device of claim 22 comprising the circuit further including a second DPC circuit configured to adjust, based on a clock cycle delay, the second clock signal to produce a third clock signal that is a write clock synchronous to patterning of the grain patterned medium.

* * * * *